United States Patent [19]
Nishida

[11] Patent Number: 5,631,901
[45] Date of Patent: May 20, 1997

[54] METHOD OF TRANSMITTING CONTROL SIGNALS AND PBX SYSTEM

[75] Inventor: Toshio Nishida, Hino, Japan

[73] Assignee: Toshiba Corporation, Kanagawa-ken, Japan

[21] Appl. No.: 499,926

[22] Filed: Jul. 10, 1995

[30] Foreign Application Priority Data

Jul. 15, 1994 [JP] Japan .................. 6-163622

[51] Int. Cl.$^6$ ........................................ H04Q 11/04
[52] U.S. Cl. .................. 370/384; 370/524; 379/96; 379/230; 379/269
[58] Field of Search ................ 370/54, 58.1, 58.2, 370/58.3, 60, 60.1, 68.1, 94.1, 94.2, 110.1, 118, 85.9, 85.11; 379/93, 94, 96, 220, 221, 229, 230, 231, 233, 234, 268, 269, 350, 396, 399

[56] References Cited

U.S. PATENT DOCUMENTS

| | | | |
|---|---|---|---|
| 4,694,452 | 9/1987 | Beckinger et al. | 370/58.2 |
| 4,903,263 | 2/1990 | Patel et al. | 370/110.1 |
| 5,159,594 | 10/1992 | Bales et al. | 370/110.1 |
| 5,212,691 | 5/1993 | Hokari | 370/110.1 |
| 5,268,958 | 12/1993 | Nakano | 379/233 |
| 5,291,549 | 3/1994 | Izumi | 379/233 |

*Primary Examiner*—Alpus H. Hsu
*Attorney, Agent, or Firm*—Finnegan, Henderson, Farabow, Garrett & Dunner, L.L.P.

[57] ABSTRACT

A large amount of control information is transmitted at high speed to a telephone terminal without changing the transfer capacity of a current control channel. When a call is terminated by any of the extension terminals, the extension terminal sends, for example, a lamp control signal to a extension terminal via D channel. thereafter, if a large amount of display control signals are to be transmitted to the extension terminal, after sending the display control signal to the extension line, a central controller causes the extension line to send a B channel seizing signal to the extension terminal via D channel. This causes paths of the B channel(s) to be so changed that both the controllers within the extension line and the extension terminal are accessible to the B channel(s). Subsequently, the extension line can transmit the display control signals at high speed to the extension terminal via B channel(s). Thus, the extension terminal displays on the display device the display control signals received through the B channel(s).

26 Claims, 8 Drawing Sheets

METHOD OF TRANSMITTING CONTROL SIGNALS AND PBX SYSTEM

BACKGROUND OF THE INVENTION

1. Field of the Invention

The present invention relates to a private branch exchange to which multifunctional telephone terminals can be connected, and particularly relates to a method of transmitting control signals for a high speed transmission of a lot of information to and from such terminals.

2. Description of the Prior Art

A private branch exchange (PBX) in recent years serves many analog or digital multifunctional telephones as well as the so-called standard telephone terminals of analog type, providing a variety of functions. Some of the multifunctional terminals are provided with their own displays to greatly enhance the operational performance by displaying the phone number and/or name of the other party at the time of originating a call or during a call, and/or by displaying information such as operation modes of them.

Further, with recent evolution in technology of integrating a computer and a PBX, displays provided for multifunctional terminals is becoming large, so that they, having access to the computer and its terminal independently of intrinsic functions of a telephone terminal, retrieves various kinds of information or offers reservation services. Prevailing among interfaces between a PBX and multifunctional terminals, is those of a type providing one controlling and two speech channels in a digital transmission system, where generally speech channels are of 64 Kbps in transfer rate and controlling channels are of 16 Kbps.

The above described controlling channel may be said to have a channel capacity or a transfer rate enough to display key information of a multifunctional terminal and control lighting amps, and further to control display of a relatively small display device. However, if multifunctional terminals with a large display being connected, a large amount of control information is to be displayed in a moment on the large display as is practiced nowadays, it is hard to say that the transfer rate of the current controlling channel is satisfactory. In order to send a large amount of control information in a moment to the large display, the transfer rate of the current controlling channel might be raised, but it would lead to an increase in the frequency of the clock, which would accordingly necessitate an enhancement in the precision of circuits relating to information transmission in response to the increase in the clock frequency.

This approach is disadvantageous not only in that it makes circuits complicated causing the cost to become high, but also in that even if a controlling channel with a high transfer rate is used, the transfer rate can not be made effective use of, which is not economical, because most of the control signals transmitted through the controlling channel are supported by terminals having small displays and according have a low information density. Thus, there is a demerit in a prior art system that if a large amount of information is to be transmitted, for display, in a moment to a multifunctional terminal having a large display, there is no available means for transmitting a large amount of information at a high rate between the terminal and the PBX system. Though even a current controlling channel permits a transmission of a large amount of control information to a large display only if taking time is permitted, a prompt access to a large display is impossible causing operational performance to deteriorate; this becomes a problem.

Since as described above, there is no means for transmitting a large amount of control information at a high rate between the terminal and the PBX system, if a large display is adopted as a display of a telephone terminal, it takes too much time to display the whole information on a large display as long as a current controlling channel is used for transmission of display information etc., which, disadvantageously, prevents the use of a large display which enables a large amount of information to be displayed, significantly imposing restrictions on the functions of telephone terminals.

SUMMARY OF THE INVENTION

It is therefore an object of the present invention to eliminate these and other disadvantages and to provide a method for transmitting control signals which is capable of transmitting a large amount of information at a high rate to a telephone terminal without changing the transfer rate of a current controlling channel and a PBX system using this method.

According to a first aspect of the invention, a method for transmitting control signals comprises the steps of: sending path switching instruction information from one of the extension circuits to corresponding one of the telephone terminals via the controlling channel; switching first paths of the speech channel in the extension circuit so as to make a first control signal processing system within the one extension circuit accessible to the speech channel; switching second paths of the speech channel in the corresponding telephone terminal in response to a reception of the path switching instruction information so as to make a second control signal processing system within the corresponding telephone terminal accessible to the speech channel; and transmitting control signals between the one extension circuit and the corresponding one of the telephone terminals via the speech channel, so that a large amount of information can be transmitted between an extension circuit and a telephone terminal and if a multifunctional telephone terminal with a large display is provided, it can fully exert its functions.

In a method for transmitting control signals according to a second aspect of the invention: if the speech channel comprises a plurality of speech channels, speech channel paths are so switched as to make a control signal processing system accessible only to a specified speech channel, so that the same effect as described above is produced even if the speech channel comprises a plurality of speech channels.

In a method for transmitting control signals according to a third aspect of the invention: when the transmission of control signals via the speech channel is completed, speech channel paths are so switched as to disconnect the speech channel from the control signal processing system within the extension circuit and connect the speech channel with a speech signal processing system within the extension circuit and as to disconnect the speech channel from the control signal processing system within the corresponding telephone terminal and connect the speech channel with a speech signal processing system within the corresponding telephone terminal, so that the speech channel can be used again for speech signal transmission after it is used for control signal transmission.

In a method for transmitting control signals according to a fourth aspect of the invention: if the speech channel comprises a plurality of speech channels, speech channel paths are so switched as to disconnect only specified speech channel from the control signal processing system and connect the disconnected specified speech channel with the speech signal processing system, so that if the speech channel comprises a plurality of speech channels, the speech channels which have been used for control signal transmission can be used again for speech signal transmission after the control signal transmission.

According to a fifth aspect of the invention, a method for transmitting control signals comprises the steps of: sending path switching instruction information from a telephone terminal controller to the PBX via said controlling channel; switching first paths of the speech channel so as to make the telephone terminal controller accessible to the speech channel; switching second paths of the speech channel in the PBX in response to a reception of the path switching instruction information so as to make a control signal processing system within the PBX accessible to the speech channel; and transmitting control signals to and from the PBX via the speech channel, so that if a multifunctional telephone terminal with a large display is provided, it can fully exert its functions.

In a method for transmitting control signals according to a sixth aspect of the invention: the transfer rate of the speech channel is at least 64 Kbps; and the transfer rate of the controlling channel is 4 through 16 Kbps, so that these channels are applicable to current PBX systems.

In a method for transmitting control signals according to a seventh aspect of the invention: a computer is connected to the PBX; and control signals are transmitted via the speech channel between the PBX and the telephone terminal when the telephone terminal retrieves stored information of the computer through the PBX, so that if a multifunctional telephone terminal with a large display is provided, it can fully exert its functions.

In a method for transmitting control signals according to an eighth aspect of the invention: the stored information of the computer is displayed on the telephone terminal and therefore a large amount of stored information of a computer can be displayed on a telephone terminal.

According to a ninth aspect of the invention, a method for transmitting control signals includes the steps of: interconnecting the each of telephone terminals and the different one of extension circuits of the PBX by a plurality of controlling channels and a speech channel; and selecting one controlling channel for sending path switching instruction information out of said controlling channels, so that many telephone terminals and the PBX can operate with control signals.

According to a tenth aspect of the invention, a method for transmitting control signals includes the steps of: interconnecting the each of telephone terminals and the different one of extension circuits of the PBX by a plurality of controlling channels and a plurality of speech channels; selecting one controlling channel for sending the path switching instruction information out of the plurality of controlling channels; and selecting one speech channel for transmitting the control signals out of the plurality of speech channels, so that many telephone terminals and the PBX can operate with control signals.

In a method for transmitting control signals according to an eleventh aspect of the invention: if the speech channel comprises a plurality of speech channels, each of the plurality of speech channels are examined to select speech channels with a high transmission quality; paths of the selected speech channels are switched so as to cause access to be given only to the selected speech channels in transmitting control signals, so that transmission of high quality is achieved.

In a method for transmitting control signals according to a twelfth aspect of the invention: if the speech channel comprises a plurality of speech channels, each of the plurality of speech channels are examined to select free speech channels; paths of the selected free channels are switched so as to cause access to be given only to the free speech channels on transmitting control signals, so that a variety of switching controls as well as transmission according to the inventive method of transmitting control signals are possible.

In a method for transmitting control signals according to a thirteenth aspect of the invention: speech channel paths are so switched that access is given only to a plurality of speech channels mutually different in channel capacity in a predetermined order, and therefore various telephone terminals and PBX can process the control signals.

In a method for transmitting control signals according to a fourteenth aspect of the invention: a variety of switching controls are possible because the telephone terminals and/or the PBX are permitted to select among the controls of sending path switching instruction information via controlling channel, switching speech channel paths and subsequently transmitting control signals via the speech channel, so that a variety of switching control is possible.

In a method for transmitting control signals according to a fifteenth aspect of the invention: the control signals are temporarily stored until the speech channel become available to the step of transmitting, so that the time for a control operation on the control signals can be freely set.

In a method for transmitting control signals according to a sixteenth aspect of the invention: the control of sending path switching instruction information via controlling channel, switching speech channel paths and subsequently transmitting control signals via the speech channel, and the control of the connection between the telephone terminals and the PBX are independently carried out, so that the controls are easy.

In a method for transmitting control signals according to a seventeenth aspect of the invention: data of the controlling channel and the speech channel are carried by packets, so that the method is applicable to packet switching systems.

In a method for transmitting control signals according to an eighteenth aspect of the invention: in response to a receipt of a control signal sent from the central controller of PBX and informing that control signals should be transmitted via the speech channel, sending means in a extension circuit sends path switching instruction information output from a control signal processing system of the extension circuit side to the corresponding telephone terminal via controlling channel; on the sending means sending the path switching instruction information to the telephone terminal, a first path switching control means connect a speech channel to the control signal processing system; in response to a receipt of the path switching instruction information sent from the extension circuit via controlling channel, a second path switching control means of the telephone terminal connect the speech channel to a control signal processing system of the telephone terminal side; and control signals are transmitted via the speech channel between the telephone terminal and the extension circuit, so that if a multifunctional telephone terminal with a large display is provided, it can fully exert its functions.

In a method for transmitting control signals according to a nineteenth aspect of the invention: if the speech channel comprises a plurality of channels, the first and second path switching control means connect an only specified channel to the control signal processing systems, so that even if the speech channel comprises a plurality of channels, the same result as just described is produced.

In a method for transmitting control signals according to a twentieth aspect of the invention: the first path switching control means, on completion of transmission of control signals via speech channel, disconnect the speech channel from the control signal processing system of the extension circuit side to connect it to a speech signal processing system and at the same time the second path switching control means, on completion of transmission of control signals via speech channel, disconnect the speech channel from the control signal processing system of the telephone terminal side to connect it to a speech signal processing system, so that the speech channel can be used again for speech signal transmission after it is used for control signal transmission.

In a method for transmitting control signals according to a twenty-first aspect of the invention: if the speech channel comprises a plurality of speech channels, then the first and second path switching control means disconnect only specified channels from the control signal processing systems and connect them to the speech signal processing systems, so that even if the speech channel comprises a plurality of channels, the only speech channels that have been used for control signal transmission can be recovered for speech channel transmission.

According to a twenty-second aspect of the invention: a method for transmitting control signals comprises a PBX, a plurality of extension circuits and a plurality of telephone terminals, each of the extension circuits arid different one of the telephone terminals being interconnected by a controlling channel and a speech channel, so that control signals and speech signals are transmitted via the controlling channel and the speech channel respectively between each telephone terminal and the corresponding extension circuit;

each of the telephone terminals comprises a telephone terminal controller, first control signal processing means, responsive to a receipt of a control signal sent from the telephone terminal controller and informing that control signals should be transmitted via the speech channel, for outputting path switching instruction information, means responsive to a receipt of the path switching instruction information for transferring the information to the PBX via the controlling channel, and first switching means operative after transferring the information for switching first paths of the speech channel so as to connect the speech channel to the first control signal processing means;

the PBX comprises second switching means responsive to a receipt of the path switching instruction information for switching second paths of the speech channel so as to connect the speech channel to second control signal processing means within the PBX; and the control signals are transmitted between the telephone terminal and the PBX via the speech channel, so that if a multifunctional telephone terminal with a large display is provided, it can fully exert its functions.

In a method for transmitting control signals according to a twenty-third aspect of the invention: the transfer rate of the speech channel is at least 64 Kbps; and the transfer rate of the controlling channel is 4 through 16 Kbps, so that the channels are applicable to current PBX systems.

In a method for transmitting control signals according to a twenty-fourth aspect of the invention: a computer is connected to the PBX; and when the telephone terminal retrieves stored information in the computer through the PBX, control signals are transmitted via the speech channel between the PBX and the telephone terminal, so that a large amount of stored information in the computer is displayed on the telephone terminal.

In a method for transmitting control signals according to a twenty-fifth aspect of the invention: the telephone terminal is provided with a display device for displaying the stored information in the computer, so that a large amount of stored information in the computer is displayed on the telephone terminal.

In a method for transmitting control signals according to a twenty-sixth aspect of the invention: each of the telephone terminals and different one of the extension circuits of the PBX are interconnected by a plurality of controlling channels and a speech channel; and the path switching instruction information is transmitted via one of the controlling channels to enable control signals to be transmitted via speech channel, so that the PBX and many telephone terminals can operate with control signals.

In a method for transmitting control signals according to a twenty-seventh aspect of the invention: each of the telephone terminals and different one of the extension circuits of the PBX are interconnected by a plurality of controlling channels and a plurality of speech channels; path switching instruction information is transmitted via one of the controlling channels; and the control signals are transmitted via one of the speech channels, so that the PBX and many telephone terminals can operate with control signals.

In a method for transmitting control signals according to a twenty-eighth aspect of the invention: if the speech channel comprises a plurality of channels, each of the speech channels is examined to select speech channels with a high transmission quality; and paths of the selected speech channels are switched so as to cause access to be given only to the speech channels of high transmission quality, so that transmission of high quality is possible.

In a method for transmitting control signals according to a twenty-ninth aspect of the invention: if the speech channel comprises a plurality of channels, each of the speech channels is examined to select free speech channels; and paths of the selected speech channels are switched so as to cause access to be given only to the free speech channels, so that transmission of high quality is possible, so that a variety of switching controls as well as transmission according to the inventive method of transmitting control signals are possible.

In a method for transmitting control signals according to a thirtieth aspect of the invention: if the speech channel comprises a plurality of channels different in transfer rate from one another, order of access is set as desired to the channels, and speech channel paths are so switched as to cause access to be given to each of the speech channels in the order of access, so that the PBX and many telephone terminals can operate with control signals.

In a method for transmitting control signals according to a thirty-first aspect of the invention: the telephone terminals and/or the PBX are permitted to select among the controls of sending path switching instruction information via controlling channel, switching speech channel paths and subsequently transmitting control signals via the speech channel, so that a variety of switching control is possible.

In a method for transmitting control signals according to a thirty-second aspect of the invention: there is provided memory for temporarily storing the control signals until the speech channel become available to transmission of the control signals, so that the time for a control operation on the control signals can be freely set.

In a method for transmitting control signals according to a thirty-third aspect of the invention: the control of sending path switching instruction information via controlling channel, switching speech channel paths and subsequently transmitting control signals via the speech channel, and the control of the connection between the telephone terminals and the PBX are independently carried out, so that the controls are easy and additionally various controls are possible.

In a method for transmitting control signals according to a thirty-fourth aspect of the invention: data of the controlling channel and the speech channel are carried by packets, so that the method is applicable to packet switching systems.

BRIEF DESCRIPTION OF THE DRAWINGS

Further objects and advantages of the present invention will be apparent from the following description of the preferred embodiments of the invention as illustrated in the accompanying drawings. In the drawings.

DETAILED DESCRIPTION OF THE PREFERRED EMBODIMENTS

Figure 1:
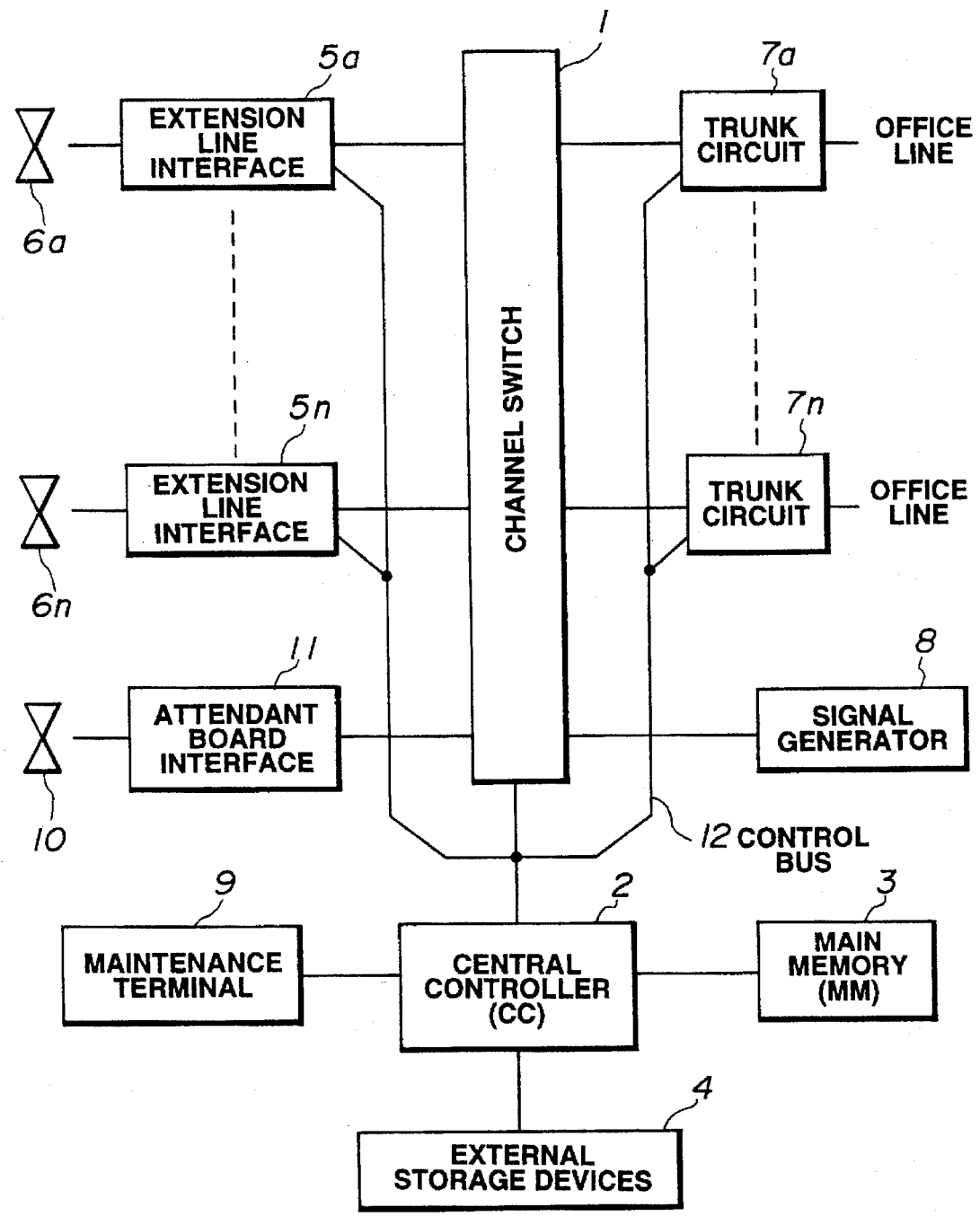
FIG. 1 is a block diagram of an illustrative embodiment of a PBX system according to the invention.

Referring to the drawings, an illustrative embodiment of the invention is described in the following.

FIG. 1 is a block diagram of an illustrative embodiment of a PBX system according to the invention. In FIG. 1 there are shown a channel switch 1 for performing switching operation between the external circuits and the extensions and between the extensions, a central controller 2 for controlling the whole exchange including the channel switch 1, a main memory 3 comprising RAM etc. for storing a control program for controlling the central controller 2, system data and extension data, external storage devices 4 comprising, for example, a hard disc device 4 used for saving information to be stored in a main memory 3 and for storing records of operation of the PBX system, extension terminals 6a through 6n which are to be connected to the channel switch 1, extension lines 5a through 5n, that is, interfaces for performing a connection operation between the channel switch 1 and respective extension terminals 5a through 5n, trunk circuits 7a through 7n, that is, interfaces for connecting an office line with the channel switch 1, a signal generator 8 for generating various kinds of tone signals, a maintenance terminal 9 connected via a built-in interface to the central controller 2 and provided with a keyboard and a display for setting data in the PBX system and entering various kinds of commands, an attendant board 10 which is to be connected to the channel switch 1, an attendant board interface 11 for connecting the attendant board 10 to the channel switch 1, a control bus 12 for providing a connection between the central controller 2, and an extension line 5, trunk circuit 7 and channel switch 1 for transmitting a variety of control signals.

Figure 2A:
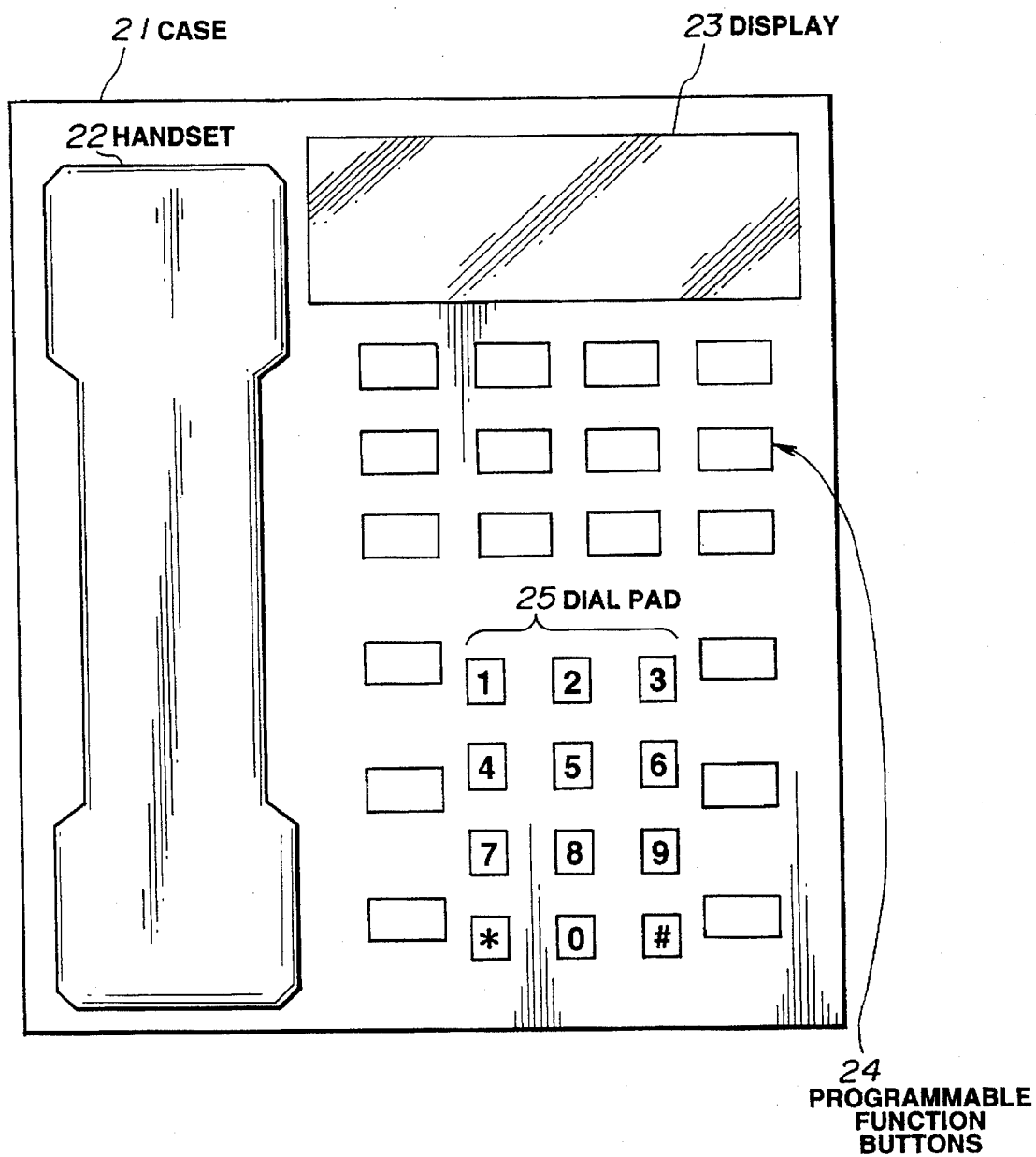
FIGS. 2 (a) and (b) show, respectively, an exterior view and the electrical constitution of an illustrative embodiment of a multifunctional telephone terminal with a display.
Figure 2B:
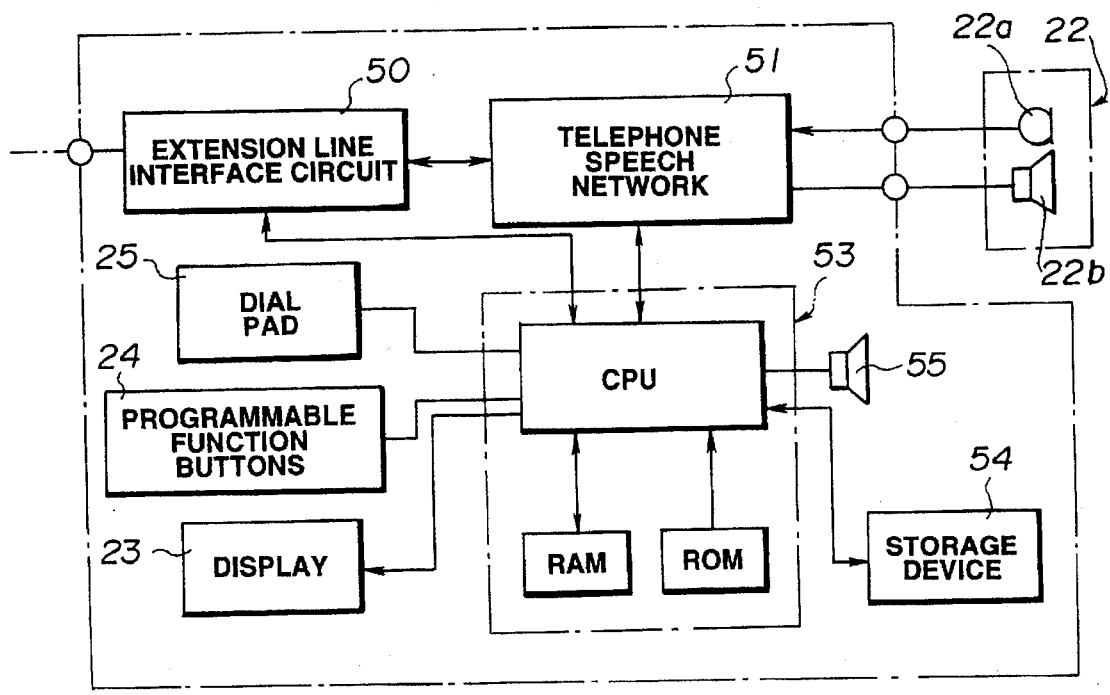

FIG. 2(a) is an exterior view of an illustrative embodiment of a multifunctional telephone terminal with a display or a kind of above described extension terminals 6. FIG. 2(b) shows an electrical construction of the multifunctional terminal. In FIG. 2(a), there are shown a case 21 of the terminal, a handset 22 (a microphone 22a and loudspeaker 22b), a display 23 for displaying a variety of information, programmable function buttons with a lamp built-in, 24, and a dial pad 25. In FIG. 2(b), there are shown a extension line 50 the detail of which is shown in FIG. 5, a telephone speech network 51 for performing amplification and sidetone processing, a controller 53 comprising a CPU, ROM in which a control program is stored and RAM used for working areas, a storage device 54, and a ringer 55.

Figure 3:
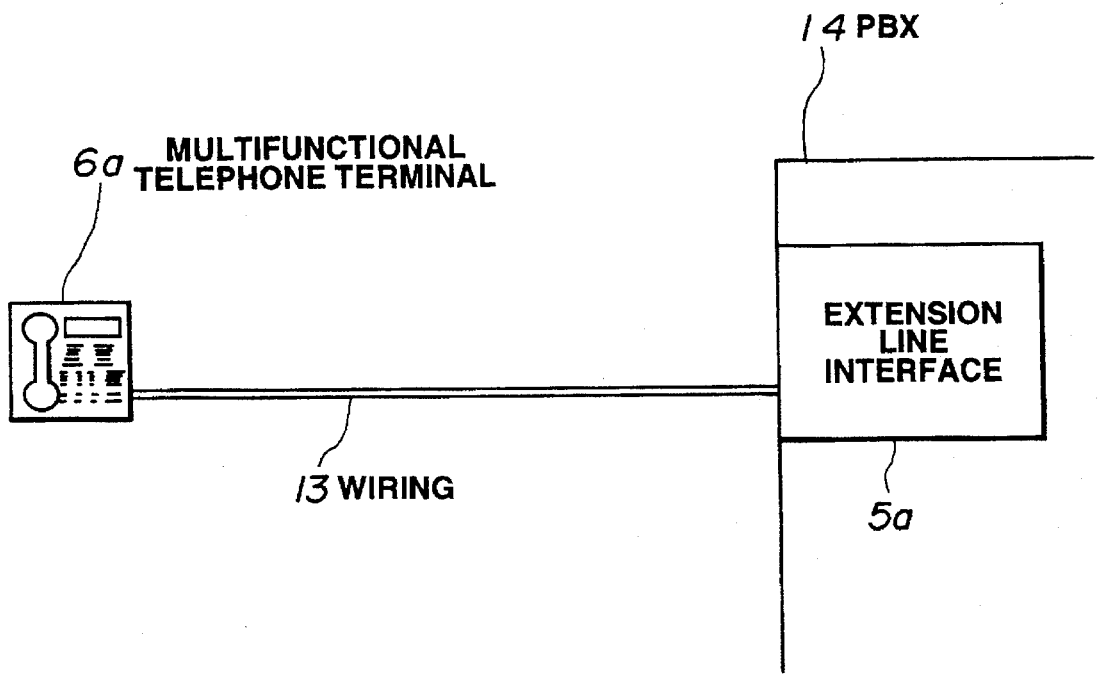
FIG. 3 is an illustration of how a multifunctional terminal is connected to a PBX.

FIG. 3 shows a manner in which a multifunctional terminal is connected by a digital interface to a PBX system via a controlling channel and a speech channel. In the figure, there are shown a multifunctional terminal 6a, a PBX 14 shown in FIG. 1, an extension line 5a provided with an interface circuit necessary for the connection of the terminal 6a, and a wiring 13 connecting the terminal 6a and the extension line 5a.

Figure 4:
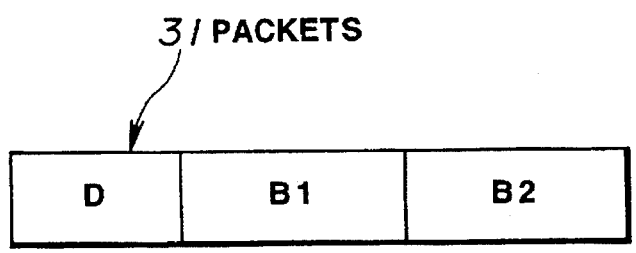
FIG. 4 is an illustration of a packet transmitted along the wire shown in FIG. 5.

FIG. 4 shows an exemplary controlling and speech channels on the above described digital interface. A packet 31 comprises a controlling channel (D channel) and two speech channels (B1 and B2 channels). A communication is provided between the terminal 6a and the extension line 5a by putting a controlling and speech signals in a packet 31 (having a certain length) and digitally transmitting the packet along the wiring 13 shown in FIG. 3. In this case, the transfer rates of the speech channels and the controlling channel are 64 Kbps and 4 to 16 Kbps respectively.

Figure 5:
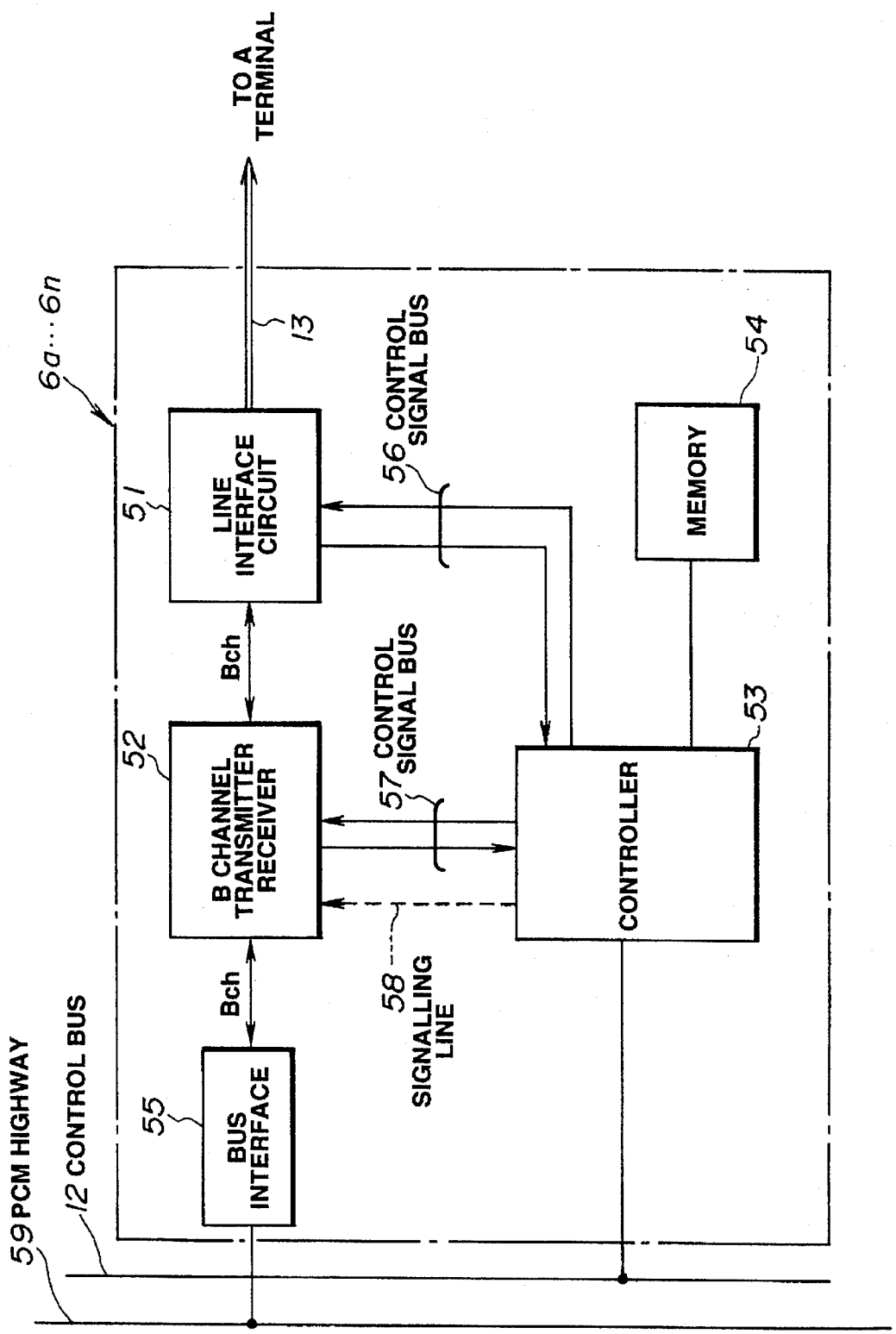
FIG. 5 is a block diagram showing a detailed embodiment of the extension line shown in FIG. 1.

FIG. 5 is a block diagram showing a detailed illustrative embodiment of the extension line 5 as described above. In FIG. 5, there are shown a line interface circuit 51 for providing an electrical connection with a wiring 13, and outputting and inputting a controlling and speech signals to and from the wiring 13, a B channel transmitter/receiver 52 for switching transmission lines so that a control signal is derived from a speech channel and output to the controller 53 and a control signal output from the controller 53 is transmitted via a speech channel, and at the same time sending and receiving a signal of each B channel, a controller 53 comprising, e.g., a CPU for controlling the whole extension line, a memory 54 for storing a program and data for controlling the controller 53, a PCM highway 59 through which a speech signal of each B channel is transmitted, a bus interface 55 for connecting the B channel transmitter/receiver 52 with the PCM highway, a control signal bus 56 for connecting the line interface circuit 51 with the controller 53 for transmitting control signals, a control signal bus 57 connecting the B channel transmitter/receiver 52 with the controller 53 for transmitting a control signal carried by each speech channel, and a signalling line 58 connecting the B channel transmitter/receiver 52 with the controller 53 for transmitting a control signal for switching transmission lines in the B channel transmitter/receiver 52.

Figure 6:
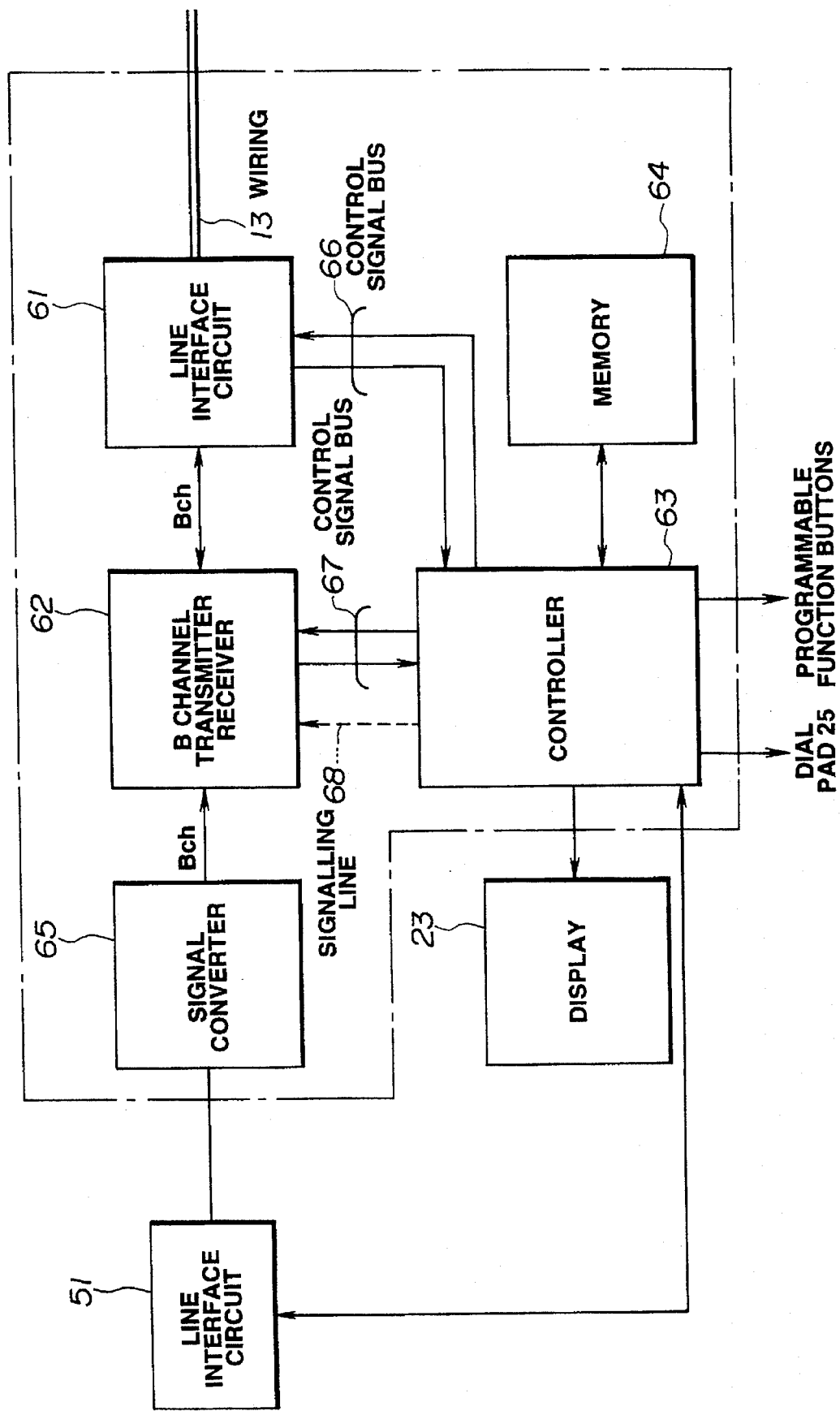
FIG. 6 is a block diagram showing a detailed embodiment of an extension line built in an extension terminal shown in FIG. 1.

FIG. 6 is a block diagram showing a detailed illustrative embodiment of the extension line built in an extension terminal shown in FIG. 1 and 2. In the figure, there are shown a line interface circuit 61 for providing an electrical connection with a wiring 13, and outputting and inputting a controlling and speech signals to and from the wiring 13, a B channel transmitter/receiver 62 for switching transmission lines so that a control signal is derived from a speech channel and output to the controller 53 and a control signal output from the controller 63 is transmitted via a speech channel, and at the same time sending and receiving a signal of each B channel, a controller 63 comprising, e.g., a CPU for controlling the whole extension line, a memory 64 for storing a program and data for controlling the controller 63, a signal converter 65 for converting a speech signal from the speech network 51 into a digital signal and converting a speech signal from the B channel transmitter/receiver into an analog signal which is output to the handset 22 via the speech network, a control signal bus 66 connecting the line interface circuit 61 with the controller 63 for transmitting control signals, a control signal bus 67 connecting the B channel transmitter/receiver 62 with the controller 63 for transmitting a control signal carried by each speech channel, and a signalling line 68 connecting the B channel transmitter/receiver 62 with the controller 63 for transmitting a control signal for switching transmission lines in the B channel transmitter/receiver 62, a display device 70 for displaying a variety of information output from the controller 63.

Operation of the embodiment is described in the following.

If an extension terminal, e.g., 6a is made to go off hook and a destination number is dialed, the destination number is sent via the extension circuit 5a and the control bus 12 to the central controller 2. On receiving the destination number, the central controller 2 looks for a free trunk circuit 7 and, if for example a trunk circuit 7a is free, passes the destination number to the circuit 7a. Then, the trunk circuit 7a sends out a dial signal corresponding to the destination number to an office line. When the destination is connected to the line as a result, the trunk circuit 7a notifies the central controller 2 of the fact through the control bus 12. In response to the notification, the central controller 2 controls the channel switch 1 to establish a speech path connecting between the trunk circuit 7a and the extension line 5a resulting in a busy state of the extension terminal 6a.

Referring now to FIG. 5, we discuss operation of the extension line 5a during operation of the PBX system with respect to a call originated from the extension terminal 6a. Specifically, the controller 53 usually communicates control signals to and from the line interface circuit 51 via the control signal bus 56. The line interface circuit 51 puts the received control signal in a controlling channel (D channel) packet and sends it out to the wiring 13, and takes out a control signal from a D channel packet input from the wiring 13 to output it to the controller 53. On the other hand, a speech signal on the PCM highway is input through the bus interface 55 to the B channel transmitter/receiver 52, where the speech signal is put in a B channel packet and then sent out through the line interface circuit 51 to the wiring 13.

When the controller 53, in this state, receives a control signal (to the effect that control signals should be communicated through the B channel (s)) from the central controller 2 shown in FIG. 1, the controller 53 gives a control to the line interface circuit 61 via the control signal bus so as to send control information to the effect that control signal is to be sent and received through the speech channel (B channel (s)), that is, path switching instruction information to the extension terminal 6a. In response to the control, the line interface circuit 61 sends the path switching instruction information to the terminal 6a via a controlling channel (D channel) packet. Also, the controller 53 outputs a low level switching signal to the B channel transmitter/receiver 52 via the signaling line 58 so as to be accessible to the B channel (s) through the control signal bus 57. The controller 53 then outputs a large amount of display information to be displayed on, e.g., the display shown in FIG. 2 to the B channel transmitter/receiver 52 via the control signal bus 57. The B channel transmitter/receiver 52 puts the received large amount of display information in a B channel packet and sends the packet through the line interface circuit 51 out to the wiring 13. It is noted that it has been assumed that the controller 53 has received the large amount of display information from the central controller 2 via the control bus 12 and reserved it in the memory Referring to FIG. 6, we discuss operation of the extension line within the extension terminal 6a during switching operation of the PBX system, in the following. Specifically, the controller 63 usually communicates control signals to and from the line interface circuit 61 via the control signal bus 66. The line interface circuit 61 puts the received control signal in a controlling channel (D channel) packet and sends it out to the wiring 13, and takes out a control signal from a D channel packet input from the wiring 13 to output it to the controller 63. Further, the line interface circuit 61 transfers signals for the B channel(s) on the wiring 13 to the B channel transmitter/receiver 62 and also transfers reversely.

A digital speech signal in a B channel packet received by the B channel transmitter/receiver 62 is converted at the signal converter 65 into an analog speech signal, which is then output to the handset 22 via the speech network 51. On the other hand, an analog speech signal output from the handset 22 is send through the speech network 51 to the signal converter 65, where it is converted into a digital speech signal, which is input to the B channel transmitter/receiver 62 and therein put in a B channel packet, which is transmitted to the PBX system.

In this state, the controller 63 receives a control signal in a controlling channel packet sent from the PBX system and derived by the line interface circuit 61. If the control signal means that control signals should be communicated using the speech channels, that is, if the signal is a path switching instruction information, then the subsequent operation will be as follows: the controller 63 outputs a low level switching signal to the B channel transmitter/receiver 62 via the signalling line 68 so as to be accessible to the B channel (s) via control signal bus 67.

Subsequently, when the B channel transmitter/receiver 62 receives for example a large amount of display control signals carried by the B channel (s) from the PBX system via the line interface circuit 61, it outputs the large amount of display control signals to the controller 63 via the control signal bus 67. The controller 63 temporarily stores the received display control signals in the memory 64 and later displays them on the display device 70.

Figure 7:
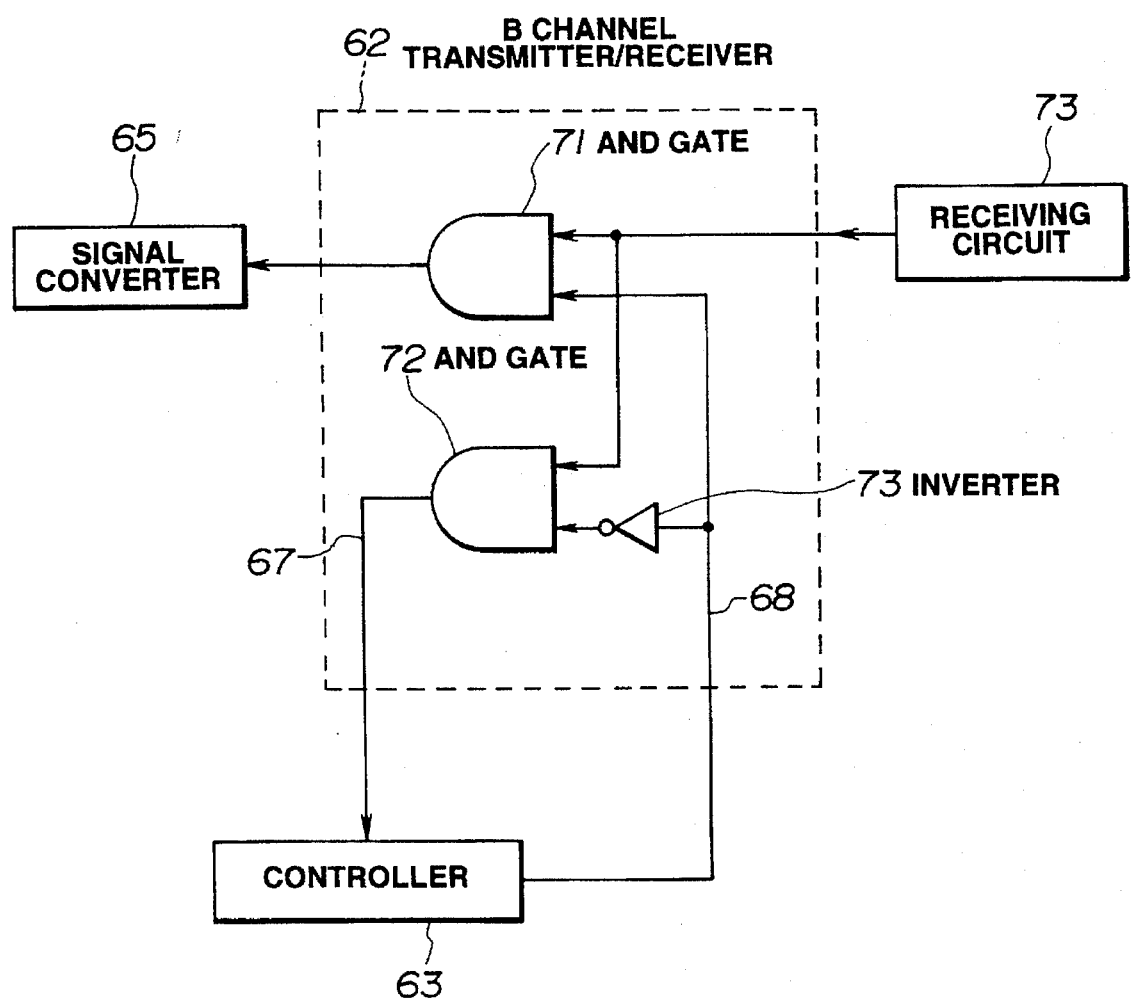
FIG. 7 is a diagram showing an illustrative embodiment of a channel switching circuit in a B channel receiver/transmitter circuit shown in FIG. 6.

FIG. 7 shows a detailed embodiment of a circuit relating to the above described path switching operation of, e.g., the B channel transmitter/receiver 62 shown in FIG. 6. While the controller 63 is asserting a high level signal on the signalling line 68, AND gate 71 is opened and AND gate 72 is closed because the AND gate 72 is supplied with the inverted version of the high level signal due to the inverter 73. Thus, a B channel signal sent from the PBX system and received by a receiving circuit 73 is output through the AND gate 71 to the signal converter 65 side.

In contrast, while the controller 63 is asserting a low level signal on the signalling line 68, the AND gate 71 is closed and the AND gate 72 is opened because the AND gate 72 is supplied with the inverted version of the low level signal due to the inverter 73. Thus, the B channel signal sent from the PBX system and received by a receiving circuit 73 is supplied through the AND gate 72 and the control signal bus 67 to the controller 63 enabling the controller 63 to receive the control signals carried by the B channel (s). It should be noted that the circuit relating to the path switching operation of the B channel transmitter/receiver 52 shown in FIG. 5 is almost the same as that shown in FIG. 7 and operates in the same manner.

It is also noted that since there are two channels B1 and B2 as the B channels transmitted along the wiring 13 shown in FIG. 5 and 6, the controllers 53 and 63 switch the channels as desired so that the transmission of control signals may be accomplished by using the channel(s) B1 and/or B2.

The above explanation has been done with respect to an example of a transmission of display control signals from the extension line 5 side to the extension terminal 6 side using the B channel(s), while control signals can be transmitted by means of the B channel (s), using the circuits shown in FIG. 5 and 6, from the extension terminal 6 side to the extension line 5 side of the PBX. Specifically, in this case, the controller 63 of the extension terminal 6 side shown in FIG. 6 passes control information to the effect that a path switching instruction information should be sent to the extension circuit 5 side to the line interface circuit 61 via the control signal bus 66, and in response to the control information, the path switching instruction information is carried By the controlling channel from the line interface circuit 61 to the wiring 13. Then, the controller 53 of the extension line 5 side shown in FIG. 5 receives the path switching instruction information on the controlling channel through the line interface circuit 51 and the control signal bus 56. On receiving the information, the controller 53 output a low level switching signal to the B channel transmitter/receiver 52 via signalling line 58 to cause the B channel transmitter/receiver 52 to change paths so as to make the controller 53 accessible to the B channels via control signal bus 57. The controller 63 not only passes the line interface circuit 61 the control information directing the transmission of path switching instruction information but also outputs a low level switching signal to the B channel transmitter/receiver 62 via signalling line 68. This causes the B channel transmitter/receiver 62 to switch paths so as to make the controller 63 accessible to the B channels via control signal bus 67.

Thereafter, the controller 63 can transmit, for example, a large amount of control signals read from the memory 64 to the extension circuit 5 side of the PBX via the B channel (s) by passing the control signals to the B channel transmitter/receiver 62 via control signal bus 67. Then, the controller 53 of the extension line 5 side derives the control signals from the B channel (s) received from the B channel transmitter/receiver 52 via control signal bus 57 and performs such operation on the control signals as sending-out onto the control bus 12.

Figure 8:
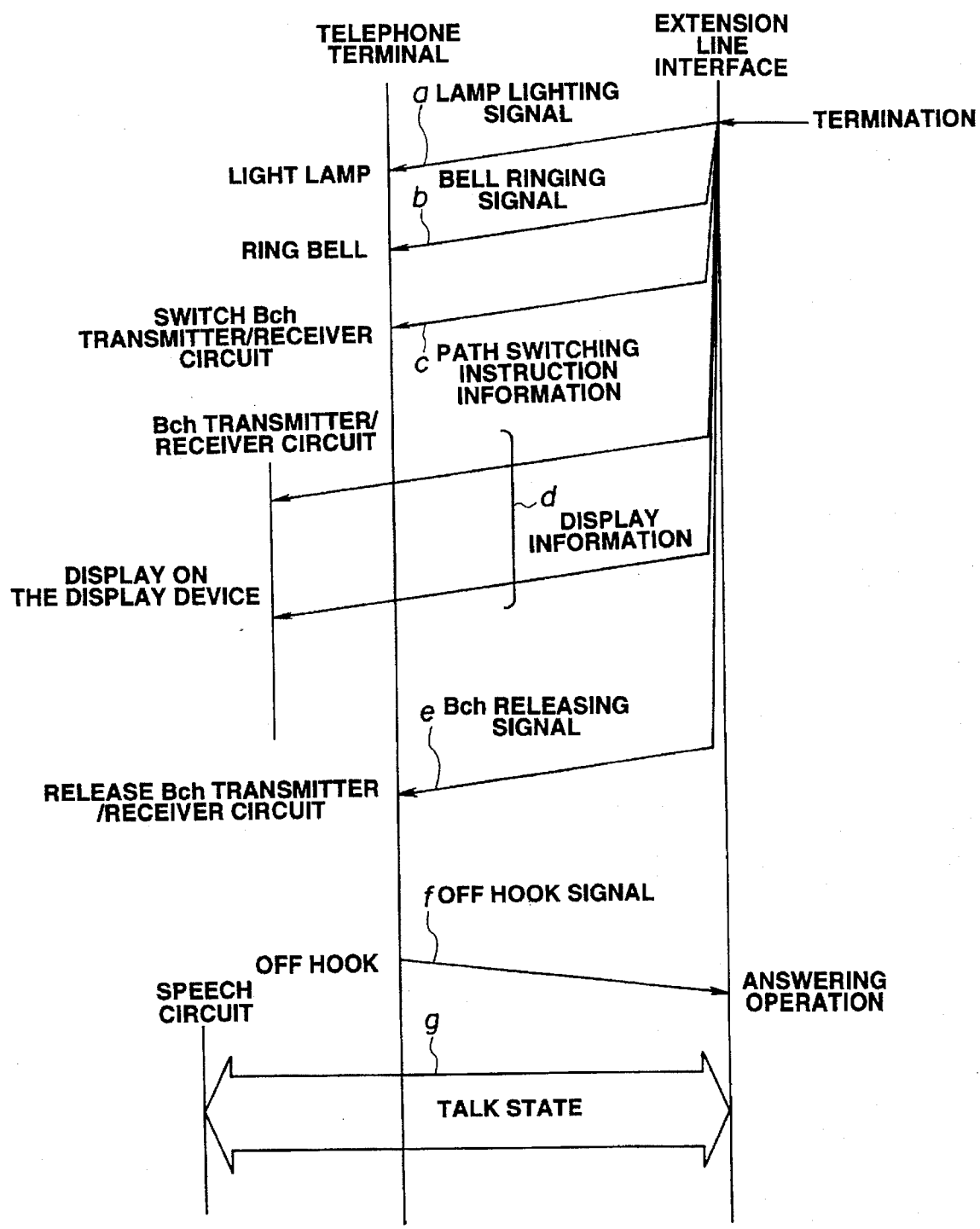
FIG. 8 is an illustration of an exemplary sequence of signals transmitted and received between a telephone terminal and extension line shown in FIG. 1.

FIG. 8 illustrates an exemplary sequence of signals transmitted and received between a telephone terminal 6 shown in FIG. 1 and extension line 5 of the PBX system in the event a call is terminated by the terminal 6. If a call is to be terminated by the terminal 6 as shown in FIG. 8, the extension line 5 sends a lamp lighting and a bell ringing signal which comprise less information content at respective times "a" and "b" to the telephone terminal 6 by means of the D channel (controlling channel). Then, the extension line 5 uses the B channel (s) for transmitting a large amount of information to send at time "c" path switching instruction information, to the effect that control signals are to be transmitted by the B channel(s), to the terminal 6 via the controlling channel. On receiving the path switching instruction information, the terminal 6 switches transmission paths in the B channel transmitter/receiver 62 as described in conjunction with FIG. 7.

Then, the extension line 5 sends a display control signal at time "d" to the terminal 6 via B channel(s). In the terminal 6, the display control signal is received by the B channel transmitter/receiver 62 shown in FIG. 6 and then displayed on the display device 23 shown in FIG. 6 (or FIG. 2). The extension line 5 sends a B channel releasing signal at time "e" to the terminal 6 by using the speech channel (s) which has been diverted to transmission and reception of control signals or the controlling channel originally intended for transmission and reception of control signals, so that the extension circuit 5 and the terminal 6 restore paths in the B channel transmitter/receiver's 52 and 62 shown in FIG. 5 and 6, respectively. When the handset 22 is lifted causing the terminal 6 to go off hook in FIG. 2, a off hook signal is sent at time "f" to the extension line 5. On receiving the off hook signal through the extension line 5, the PBX system operates in response to the signal to establish a path using the B channel between the terminal 6 and the extension line 5 resulting in a conversation state.

According to the invention, there is provided a PBX system capable of bidirectionally transmitting a large amount of control information necessary, e.g., for a large size display at a high transfer rate between an extension circuit 5 and a telephone terminal 6 without causing an increase in the cost by switching B channel transmission paths before the transmission of the large amount of information between the extension circuit 5 and the telephone terminal 6 so as to enable both the controllers 53 and 63 within the extension circuit 5 and the terminal 6, respectively, to have an access to the B channels, and by utilizing the B channels the transmission. Therefore, if a multifunctional telephone set with a large display device is used as a telephone terminal 6, it is possible to transmit enough amount of information between the extension line 5 and the terminal 6 to permit the terminal 6 to be used as a terminal of a computer connected to the central controller 2 or an office line via a modem, enabling the functions of the multifunctional telephone terminal to be improved remarkably. Further, in the embodiment, the D channel is used for transmission of control signals with a small information content such as control signals for a lamp and keys without changing the transfer rate of the D channel, that is, the channel capacity can be effectively utilized, which is achieved by conventional hardware at a less cost because there is no need of using a channel with a transfer capacity specially raised. Thus, according to the embodiment of the invention, it is possible to transmit data between the central controller 2 of the exchange and the controller of a telephone terminal or a extension terminal by using the speech channel (s) as well as the controlling channel. Therefore, the scale of data transmission in a exchange system is possible in such a way as follows: by providing a telephone terminal with functions of a speech terminal, the terminal collects maintenance data in cooperation with the central controller of the exchange or the controller of an extension line while performing operation by these functions.

In the above embodiment, one controlling channel (D channel) and two speech channels (B channels) are described, while a channel for use may be selected from a plurality of controlling channels. Also, a controlling and a speech channel different from each other in the transfer capacity may be selected.

The quality of transmission may be improved by examining each of a plurality of channels one by one and selectively switching paths of speech channels so that access is given to only channels of high transmission quality. A variety of switching controls are possible by examining each of a plurality of channels one by one and selectively switching paths of speech channels so that access is given to only free channels. Furthermore, a telephone terminal and/or a PBX may make a selection from the control schemes of the inventive method of transmitting control signals. It should be noted that there may be provided two controllers dedicated to each connection control between the central controller 2 and the channel switch and between the central controller 2 and a telephone terminal and may perform the controls independently. In this case, the control can be performed more easily.

As described above, according to the first or eighteenth aspect of the invention, a large amount of control information is transmitted to the telephone terminal at high speed without changing the transfer capacity of a current control channel.

According to the second or nineteenth aspect of the invention, the same effect as in just stated case is again produced if the speech channel comprises a plurality of channels.

According to the third or twentieth aspect of the invention, the speech channel can be used again after it has been used for transmission of control signals.

According to the fourth or twenty-first aspect of the invention, if the speech channel comprises a plurality of channels, the channel which has been used for transmission of control signals can be recovered for the use for transmission of speech signals.

According to the fifth or twenty-second aspect of the invention, transmission of control signals to and from the PBX is achieved by the speech channel (s) after paths of the speech channel are switched to make the terminal controller accessible to the speech channel, so that if a multifunctional telephone terminal with a large display is provided, it can exert its full functions.

According to the sixth or twenty-third aspect of the invention, the speech channel has a transfer capacity of at least 64 Kbps and the controlling channel has a transfer capacity of 4 to 16 Kbps, so that they are applicable as they are to a current PBX system.

According to the seventh or twenty-fourth aspect of the invention, if a telephone terminal retrieves a large amount of information stored in a computer through the PBX, the retrieved information can be displayed by the telephone terminal because transmission of control signals between the PBX and the terminal is achieved by the speech channel.

According to the eighth or twenty-fifth aspect of the invention, stored information in a computer the display of which is achieved by the display device of the telephone terminal can be displayed on a large amount at acceptable speed by the terminal.

According to the ninth or twenty-sixth aspect of the invention, a plurality of controlling channels are provided and a transmission of control signal is also achieved through an access to a speech channel while sending path switching instruction information via one of the controlling channels, so that various telephone terminals and PBX can process the control signals.

According to the tenth or twenty-seventh aspect of the invention, a plurality of controlling channels and a plurality of speech channels are provided and a transmission of control signal is also achieved through an access to one of the plurality of speech channels while sending path switching instruction information via one of the plurality of controlling channels, so that various telephone terminals and PBX can process the control signals.

According to the eleventh or twenty-eighth aspect of the invention, a high quality transmission is possible by examining a plurality of speech channels one by one and selectively switching paths of the speech channel so as to cause access to be given to only speech channels of high transmission quality.

According to the twelfth or twenty-ninth aspect of the invention, a variety of switching controls as well as transmission according to the inventive method of transmitting control signals are possible by examining a plurality of speech channels one by one and selectively switching paths of the speech channel so as to cause access to be given to only free speech channels.

According to the thirteenth or thirtieth aspect of the invention, speech channel paths are so switched that access is given only to a plurality of speech channels mutually different in channel capacity in a predetermined order, and therefore various telephone terminals and PBX can process the control signals.

According to the fourteenth or thirty-first aspect of the invention, a variety of switching controls are possible because the telephone terminals and/or the PBX can determine how to control.

According to the fifteenth or thirty-second aspect of the invention, the time for a control operation can be freely set, because the relevant control signals are temporarily stored till the transmission of control signals by means of a speech channel becomes possible.

According to the sixteenth or thirty-third aspect of the invention, by independently executing the control of connection between the telephone terminals and the PBX and the control for the operation of sending path switching instruction information via controlling channel to seize a speech channel and subsequently transmitting control signals via the speech channel, it is possible to execute the controls more easily in a various ways.

According to the seventeenth or thirty-fourth aspect of the invention, data of controlling channel and speech channel are transmitted by packets, so that the packet transmission is available in switching control is possible.

Many widely different embodiments of the present invention may be constructed without departing from the spirit and scope of the present invention. It should be understand that the present invention is not limited to the specific embodiments described in the specification, except as defined in the appended claims.

What is claimed is:

1. A method for transmitting control signals in a private branch exchange (PBX), wherein control signals are transmitted by a controlling channel and speech signals are transmitted by a speech channel respectively between each of telephone terminals and a different one of corresponding extension circuits, said method comprising the steps of:

sending a path switching instruction information from one of said extension circuits to one of said telephone terminals by said controlling channel;

switching paths of said speech channel in said extension circuit so as to make a control signal processing system within said one extension circuit accessible not only to said controlling channel but also to said speech channel;

switching paths of said speech channel in said telephone terminal in response to a reception of said path switching instruction information so as to make a control signal processing system within said telephone terminal accessible not only to said controlling channel but also to said speech channel;

transmitting and receiving control signals between said one extension circuit and said telephone terminal by said speech channel;

when transmission of control signals by said speech channel is complete, transmitting information from said extension circuit to said telephone terminal; and switching said paths of said speech channel to disconnect said speech channel from said control signal processing system within said telephone terminal and to connect said speech channel with said speech signal processing system within said telephone terminal.

2. A method for transmitting controls signals in a private branch exchange (PBX), wherein control signals are transmitted by a controlling channel and speech signals are transmitted by a speech channel respectively between each of telephone terminals and a different one of corresponding extension circuits, said method comprising the steps of:

sending a path switching instruction information from one of said telephone terminals to one of said extension circuits by said controlling channel;

switching paths of said speech channel in said telephone terminal so as to make a control signal processing system within said telephone terminal accessible not only to said controlling channel but also to said speech channel;

switching paths of said speech channel in said one extension circuit in response to a reception of said path switching instruction information so as to make a control signal processing system within said one extension circuit accessible not only to said controlling channel but also to said speech channel;

transmitting and receiving control signals between said one extension circuit and said telephone terminal by said speech channel;

when transmission of control signals by said speech channel is complete, transmitting information from said telephone terminal to said extension circuit; and switching said paths of said speech channel to disconnect said speech channel from said control signal processing system within said one extension circuit and to connect said speech channel with a speech signal processing system within said one extension circuit.

3. A method for transmitting control signals in a private branch exchange (PBX), wherein control signals are transmitted by more than one controlling channel and speech signals are transmitted by a plurality of speech channels respectively between each of telephone terminals and a different one of corresponding extension circuits, said method comprising the steps of:

sending a path switching instruction information from one of said extension circuits to one of said telephone terminals by at least one controlling channel in said more than one controlling channel;

switching paths of at least one speech channel in a plurality of speech channels in said extension circuit so as to make a control signal processing system within said one extension circuit accessible not only to said more than one controlling channel but also to at least one speech channel in a plurality of speech channels;

switching paths of at least one speech channel in a plurality of speech channels in said telephone terminal in response to a reception of said path switching instruction information so as to make a control signal processing system within said telephone terminal accessible not only to said more than one controlling channel but also to at least one speech channel in a plurality of speech channels;

transmitting and receiving control signals between said one extension circuit and said telephone terminal by at least one speech channel in plurality of speech channels;

when transmission of control signals by said speech channel used for transmitting control signals is complete, transmitting information from said extension circuit to said telephone terminal; and switching said paths of said speech channel to disconnect said speech channel used for transmitting control signals from said control signal processing system within said telephone terminal and to connect said speech channel with said speech signal processing system within said telephone terminal.

4. A method for transmitting control signals in a private branch exchange (PBX), wherein control signals are transmitted by more than one controlling channels and speech signals are transmitted by a plurality of speech channels respectively between each of telephone terminals and a different one of corresponding extension circuits, said method comprising the steps of:

sending a path switching instruction information from one of said telephone terminals to one of said extension circuits by at least one controlling channel in said more than one controlling channel;

switching paths of at least one speech channel in a plurality of speech channel in said telephone terminals so as to make a control signal processing system within said telephone terminals accessible not only to said more than one controlling channel but also to at least one speech channel in a plurality of speech channels;

switching paths of at least one speech channel in a plurality of speech channels in said one extension circuit in response to a reception of said path switching instruction information so as to make a control signal processing system within said one extension circuit accessible not only to said more than one controlling channel but also to at least one speech channel in a plurality of speech channels;

transmitting and receiving control signals between said one extension circuit and said telephone terminal by at least one speech channel in a plurality of speech channels;

when transmission of control signals by said speech channel used for transmitting control signals is complete, transmitting information from said telephone terminal to said extension circuit; and switching said paths of said speech channel to disconnect said speech channel used for transmitting control signals from said control signal processing system within said one extension circuit and to connect said speech channel with said speech signal processing system within said one extension circuit.

5. The method according to claim 1 or 2 or 3, further comprising the steps of:
setting the transfer rate of said controlling channel to 4 through 16 Kbps.

6. The method according to claim 1 or 2 or 3, further comprising the steps of:
connecting a computer to said PBX; and
transmitting control signals via said speech channel between said PBX and said telephone terminal when said telephone terminal retrieves stored information of said computer through said PBX.

7. The method according to claim 6 wherein:
said step of transmitting control signals via said speech channel includes the step of displaying said stored information of said computer on said telephone terminal.

8. The method according to claim 1 or 2 or 3, further comprising, prior to said step of transmitting, the step of:
temporarily storing said control signals until said speech channel becomes available to said step of transmitting.

9. A method for transmitting control signals according to claim 1 or 3, wherein a speech path is formed between said telephone terminal and said extension circuit due to a hooking-off operation at said telephone terminal and a speech mode is produced after said telephone terminal receives, from said extension circuit, information of completion of control signals transmission used for transmitting control signals via said speech channel.

10. A method for transmitting control signals according to claim 3 or 4, wherein one of a plurality of said speech channels is used for transmitting control signals.

11. A method for transmitting control signals according to claim 3 or 4, wherein one speech channel is selected according to transmission quality of a plurality of speech channels when one of a plurality of speech channels is used for transmitting control signals.

12. A method for transmitting control signals according to claim 3 or 4, wherein one speech channel is selected based on a transmission capacity of a plurality of speech channels when one in a plurality of speech channels is used for transmitting control signals.

13. A method for transmitting control signals according to claim 2 or 4, wherein one speech channel is selected according to an empty/filled capacity information of a plurality of speech channels when one in a plurality of speech channels is used for transmitting control signals.

14. A private branch exchange system for transmitting and receiving respectively control signals by a controlling channel and speech signals by a speech channel between a telephone terminal and a corresponding extension circuit of a private branch exchange,
said extension circuit of the system comprising:
means for transmitting a path switching instruction information by said controlling channel to said telephone terminal; and
means for switching a path of said speech channel so as to enable a control signal processing system in said extension circuit to give access not only to said controlling channel but also to said speech channel;
said telephone terminal of the system comprising:
means for switching a path of said speech channel on receiving said path switching instruction information so as to enable a control signal processing system in said telephone terminal to give access not only to said controlling channel but also to said speech channel;
permitting transmission and reception of control signals between said extension circuit and said telephone terminal by said speech channel;
said extension circuit further comprising means for transmitting information of completion of control signals transmission by said speech channel; and
said telephone terminal further comprising means for separating a speech channel from a control signal processing system of said telephone terminal and connecting said speech channel to a speech signal processing system of said telephone terminal.

15. A private branch exchange system for transmitting and receiving respectively control signals by a controlling channel and speech signals by a speech channel between a telephone terminal and a corresponding extension circuit of a private branch exchange;
said telephone terminal of the system comprising:
means for transmitting a path switching instruction information by said controlling channel to said extension circuit; and
means for switching a path of said speech channel so as to enable a control signal processing system in said telephone terminal to give access not only to said controlling channel but also to said speech channel;
said extension circuit of the system comprising:
means for switching a path of said speech channel on receiving said path switching instruction information so as to enable a control signal processing system in said extension circuit to give access not only to said controlling channel but also to said speech channel, thereby permitting transmission and reception of control signals between said extension circuit and said telephone terminal by said speech channel;
said telephone terminal further comprising means for transmitting information of completion of control signals transmission by said speech channel; and
said extension circuit further comprising means for separating a speech channel from a control signal processing system of said extension circuit and connecting said speech channel to a speech signal processing system of said extension circuit.

16. A private branch exchange system comprising:
a plurality of trunk circuits, each trunk circuit connected to an office line making a call originating/incoming control and forming a speech path between said each trunk circuit and said office lines;
a plurality of telephone terminals;
a plurality of extension circuits, each extension circuit being connected to one corresponding telephone terminal and sending/receiving control signals and speech signals between said each extension circuit and said connected telephone terminal;
a channel switch forming a speech path for a plurality of extension circuits and also forming a speech path between one of a plurality of extension circuits and one of a plurality of trunk circuits;
a central control unit which controls a formation of said speech path within said channel switch and sends/ receives control signals between a plurality of extension circuits and a plurality of trunk circuits;
a control channel which connects a plurality of telephone terminals and a corresponding extension circuit and sends/receives controls signals between each said extension circuit and said telephone terminal; and a speech channel which connects a plurality of telephone terminals and said corresponding extension circuit and sends/receives speech signals between each said extension circuit and said telephone terminal;

wherein said each extension circuit and said each telephone terminal have a control signal processing means for processing control signals and a speech signal processing means for processing speech signals;

wherein said each extension circuit has a switching instruction means for sending a path switching instruction information to said corresponding telephone terminal by one of said control channels, and a first path switching means which switches paths of said speech channel so as to make a control signal processing system within said extension circuit accessible not only to said controlling channel but also to said speech channel when said path switching means within said extension circuit sends a path switching instruction information;

wherein said telephone terminals equip a first path switching means for switching paths of said speech channel so as to make a control signal processing system within said corresponding telephone terminal accessible not only to said controlling channel but also to said speech channel in response to a reception of said path switching instruction information from said switching instruction means of said extension circuit;

wherein said extension circuit has a termination notice means for sending a termination notice to terminate transmission of control signals by said speech channel to said telephone terminal when a transmission of control signal by said speech channel is terminated, and a first restoration processing means for restoring by connecting to said speech signal processing means of said extension circuit to separate said speech channel from said control signal processing means of said extension circuit when said termination notice means of said extension circuit sends; and wherein said telephone terminal has a first restoration processing means for restoring by connecting to said speech signal processing means of said telephone terminal to separate said speech channel from said control signal processing means of said telephone terminal when said termination notice is received from said termination notice means of said extension circuit.

17. A private branch exchange system comprising:

a plurality of trunk circuits, each trunk circuit connected to an office line making a call originating/incoming control and forming a speech path between said each trunk circuit and said office lines;

a plurality of telephone terminals;

a plurality of extension circuits, each extension circuit being connected to one corresponding telephone terminal and sending/receiving control signals and speech signals between said each extension circuit and said connected telephone terminal;

a channel switch forming a speech path for a plurality of extension circuits and also forming a speech path between one of a plurality of extension circuits and one of a plurality of trunk circuits;

a central control unit which controls a formation of said speech path within said channel switch and sends/receives control signals between a plurality of extension circuits and a plurality of trunk circuits;

a control channel which connects a plurality of telephone terminals and a corresponding extension circuit and sends/receives control signals between each said extension circuit and said telephone terminal; and a speech channel which connects a plurality of telephone terminals and said corresponding extension circuit and sends/receives speech signals between each said extension circuit and said telephone terminal;

wherein said each extension circuit and said each telephone terminal have a control signal processing means for processing control signals and a speech signal processing means for processing speech signals;

wherein said each telephone terminal consists of a switching instruction means for sending a path switching instruction information from said telephone terminal to said extension circuit by said control channel, and a second path switching means for switching paths of said speech channel so as to make said control signal processing means within said telephone terminal accessible not only to said controlling channel but also to said speech channel when said path switching means within said telephone terminal sends a path switching instruction information;

wherein said extension circuit has a second path switching means for switching paths of said speech channel in response to a reception of said path switching instruction information from said switching instruction means of said telephone terminal so as to make said control signal processing means within said extension circuit accessible not only to said controlling channel but also to said speech channel;

wherein said telephone terminal includes a terminal notice means for sending a termination notice for terminating transmission of control signals by said speech channel to said extension circuit when transmission of control signals by said speech channel is terminated, and a second restoration processing means for restoring by connecting to a speech signal processing means of said telephone terminal to separate said speech channel from said control signal processing means of said telephone terminal when a termination notice of said telephone terminal means is sent; and wherein said extension circuit has a second restoration processing means for restoring of connecting to a speech signal processing means of said extension circuit to separate said speech channel from a control signal processing means of said extension circuit when said termination notice is received from said termination notice means of said telephone terminal.

18. A private branch exchange system comprising:

a plurality of trunk circuits, each trunk circuit connected to an office line making a call originating/incoming control and forming a speech path between said each trunk circuit and said office lines;

a plurality of telephone terminals;

a plurality of extension circuits, each extension circuit being connected to one corresponding telephone terminal and sending/receiving control signals and speech signals between said each extension circuit and said connected telephone terminal;

a channel switch forming a speech path for a plurality of extension circuit and also forming a speech path between one of a plurality of extension circuits and one of a plurality of trunk circuits;

a central control unit which controls a formation of said speech path within said channel switch and sends/receives control signals between a plurality of extension circuits and a plurality of trunk circuits;

more than one control channel which connects a plurality of telephone terminals and a corresponding extension circuit and sends/receives control signals between each said extension circuit and said telephone terminal; and a plurality of speech channels which connect a plurality of telephone terminals and said corresponding extension circuit and send/receive speech signals between each said extension circuit and said telephone terminal;

wherein said each extension circuit and said each telephone terminal have a control signal processing means for processing control signals and a speech signal processing means for processing speech signals;

wherein said each extension circuit has a switching instruction means for sending a path switching instruction information to said corresponding telephone terminal by a controlling channel in more than one controlling channel, and a first path switching means which switches paths of more than one speech channel in said speech channels so as to make a control signal processing system within said extension circuit accessible not only to said controlling channels but also to more than one speech channel in said speech channels when said path switching means within said extension circuit sends a path switching instruction information;

wherein said telephone terminals equip a first path switching means for switching paths of more than one speech channel in said speech channels so as to make a control signal processing system within said corresponding telephone terminal accessible not only to said controlling channel but also to more than one speech channel in said speech channel in response to a reception of said path switching instruction information from said switching instruction means of said extension circuit;

wherein said extension circuit has a termination notice means for sending a termination notice to terminate transmission of control signals by more than one speech channel in said speech channels to said telephone terminal when a transmission of control signal by more than one speech channel in said speech channels is terminated, and a first restoration processing means for restoring by connecting to said speech signal processing means of said extension circuit to separate more than one speech channel in said speech channels from said control signal processing means of said extension circuit when said termination notice means of said extension circuit is sent; and wherein said telephone terminal has a first restoration processing means for restoring by connecting to said speech signal processing means of said telephone terminal to separate more than one speech channel in said speech channels from said control signal processing means of said telephone terminal when said termination notice is received from said termination notice means of said extension circuit.

19. A private branch exchange system comprising:

a plurality of trunk circuits, each trunk circuit connected to an office line making a call originating/incoming control and forming a speech path between said each trunk circuit and said office lines;

a plurality of telephone terminals;

a plurality of extension circuits, each extension circuit being connected to one corresponding telephone terminal and sending/receiving control signals and speech signals between said each extension circuit and said connected telephone terminal;

a channel switch forming a speech path for a plurality of extension circuits and also forming a speech path between one of a plurality of extension circuits and one of a plurality of trunk circuits;

a central control unit which controls a formation of said speech path within said channel switch and sends/receives control signals between a plurality of extension circuits and a plurality of trunk circuits;

more than one control channel which connects a plurality of telephone terminals and a corresponding extension circuit and sends/receives control signals between each said extension circuit and said telephone terminal; and a plurality of speech channels which connect a plurality of telephone terminals and said corresponding extension circuit and send/receive speech signals between each said extension circuit and said telephone terminal;

wherein said each extension circuit and said each telephone terminal have a control signal processing means for processing control signals and a speech signal processing means for processing speech signals;

wherein said each telephone terminal consists of a switching instruction means for sending a path switching instruction information from said telephone terminal to said extension circuit by a controlling channel in more than one controlling channel, and a second path switching means for switching paths of more than one speech channel in said speech channels, so as to make said control signal processing means within said telephone terminal accessible not only to said controlling channel but also to more than one speech channel in said speech channels when said path switching means within said telephone terminal sends a path switching instruction information;

wherein said extension circuit has a second path switching means for switching paths of more than one speech channel in said speech channels in response to a reception of said path switching instruction information from said switching instruction means of said telephone terminal, so as to make said control signal processing means within said extension circuit accessible not only to said controlling channel but also to more than one speech channel in said speech channels;

wherein said telephone terminal includes a termination notice means for sending a termination notice for terminating transmission of control signals by more than one speech channel in said speech channels to said extension circuit when transmission of control signals by more than one speech channel in said speech channels is terminated, and a second restoration processing means for restoring by connecting to a speech signal processing means of said telephone terminal to separate more than one speech channel in said speech channels from said control signal processing means of said telephone terminal when a termination notice of said telephone terminal means is sent; and wherein said extension circuit has a second restoration processing mean for restoring by connecting to a speech signal processing means of said extension circuit to separate more than one speech channel in said speech channels from a control signal processing means of said extension circuit when said termination notice is received from said termination notice means of said telephone terminal.

20. A private branch exchange system according to claim 14, 16, or 18, wherein said telephone terminal comprises display means for displaying information, and display control signals are transmitted to said display means via said speech channel.

21. A private branch exchange according to claim 16, 17, 18, or 19, wherein said termination notice means in said extension circuit and said termination notice means in said telephone terminal send said termination notice via said controlling channel receiving said path switching instruction information.

22. A private branch exchange according to claim 16, 17, 18, or 19, wherein said termination notice means in said extension circuit and said termination notice means in said telephone terminal send a termination notice using speech channel used for terminating control signals.

23. A private branch exchange according to claim 16, 17, 18, or 19, wherein said first path switching means in said extension circuit and said termination notice means in said telephone terminal use one of a plurality of said speech channels for transmitting control signals.

24. A private branch exchange according to claim 16, 17, 18, or 19, wherein said first path switching means in said extension circuit and said termination notice means in said telephone terminal select one of said speech channels based on a transmission quality of a plurality of said speech channel when one of a plurality of said speech channels is used for transmitting control signals.

25. A private branch exchange according to claim 16, 17, 18, or 19, wherein said first path switching means in said extension circuit and said termination notice means in said telephone terminal select one of said speech channels based on whether a plurality of said speech channels is open, when one of a plurality of said speech channel is used for transmitting control signals.

26. A private branch exchange according to claim 16, 17, 18, or 19, wherein said first path switching means in said extension circuit and said termination notice means in said telephone terminal select one of said speech channels based on transmission capacity of a plurality of said speech channels when one of a plurality of said speech channels is used for transmitting control signals.

* * * * *

UNITED STATES PATENT AND TRADEMARK OFFICE
CERTIFICATE OF CORRECTION

PATENT NO. : 5,631,901
DATED : May 20, 1997
INVENTOR(S) : Toshio NISHIDA

It is certified that error appears in the above-indentified patent and that said Letters Patent is hereby corrected as shown below:

Title page, Item [57], in the Abstract, lines 5-6, "a extension" should read --an extension--; line 6, "thereafter" should read --Thereafter--.

Claim 5, column 17, line 2, after "steps of:", insert the following paragraph: --setting the transfer rate of said speech channel to at least 64 Kbps; and--.

Claim 18, column 20, line 61, "circuit" should read --circuits--.

Claim 19, column 22, line 56, "mean" should read --means--.

UNITED STATES PATENT AND TRADEMARK OFFICE
CERTIFICATE OF CORRECTION

PATENT NO. : 5,631,901
DATED : May 20, 1997
INVENTOR(S) : Toshio Nishida

It is certified that error appears in the above-identified patent and that said Letters Patent is hereby corrected as shown below:

Claim 25, column 24, line 9, "channel" should read --channels--.

Signed and Sealed this

Third Day of February, 1998

Attest:

BRUCE LEHMAN

Attesting Officer

Commissioner of Patents and Trademarks